US012639282B1

(12) United States Patent
Yang et al.

(10) Patent No.: US 12,639,282 B1
(45) Date of Patent: May 26, 2026

(54) VECTOR INDEX BUILDING IN DISTRIBUTED COMPUTING SYSTEM

(71) Applicant: Databricks, Inc., San Francisco, CA (US)

(72) Inventors: Jiacheng Yang, Santa Clara, CA (US); Zhidong Qu, Milpitas, CA (US); Erik Michael Lindgren, New York, NY (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 19/041,913

(22) Filed: Jan. 30, 2025

(51) Int. Cl.
*G06F 16/22* (2019.01)
*G06F 16/27* (2019.01)

(52) U.S. Cl.
CPC ........ *G06F 16/2282* (2019.01); *G06F 16/278* (2019.01)

(58) Field of Classification Search
CPC .... G06F 18/23; G06F 16/285; G06F 16/2282; G06F 18/278
USPC ........................................................ 707/802
See application file for complete search history.

(56) References Cited

U.S. PATENT DOCUMENTS

| | | | | |
|---|---|---|---|---|
| 6,233,575 | B1 * | 5/2001 | Agrawal | ............... G06F 16/355 |
| 12,135,711 | B2 * | 11/2024 | Arnold | .............. G06F 16/24537 |

| | | | |
|---|---|---|---|
| 2018/0217836 | A1 | 8/2018 | Johnson |
| 2021/0272559 | A1 | 9/2021 | Medalion et al. |
| 2023/0195845 | A1 | 6/2023 | Dasgupta et al. |
| 2023/0401217 | A1 * | 12/2023 | Arnold ............. G06F 16/24566 |
| 2024/0078232 | A1 * | 3/2024 | Arnold ............. G06F 16/24537 |
| 2024/0362223 | A1 | 10/2024 | Lougovtsov et al. |

OTHER PUBLICATIONS

Amazon, "Server-Side Encryption with Customer Keys," date unknown, 8 pages, [Online] [Retrieved on May 7, 2025] Retrieved from the Internet <URL: https://docs.aws.amazon.com/AmazonS3/latest/userguide/ServerSideEncryptionCustomerKeys.html >.
Amazon Web Services, "Amazon S3 Multipart Upload Overview," date unknown, 7 pages, [Online] [Retrieved on May 7, 2025] Retrieved from the Internet <URL https://docs.aws.amazon.com/AmazonS3/latest/userguide/mpuoverview.html >.

(Continued)

*Primary Examiner* — Hung T Vy
(74) *Attorney, Agent, or Firm* — Fenwick & West LLP

(57) ABSTRACT

A data processing service receives a data table which includes a plurality of rows of data. The service assigns the plurality of rows of data to a plurality of computing nodes. The computing nodes belongs to a distributed computing system. At each assigned computing node, the service applies a machine learning (ML) model to the assigned rows of data for indexing each row in the data table. The ML model is trained to determine a set of centroids, and each centroid is associated with a centroid ID. For each row of data in the data table, the service receives a centroid ID of one of the plurality of centroids that the respective row of data is assigned to. The service generates an index of the data table with at least the received centroid ID of each of the plurality of row of data in the data table.

20 Claims, 6 Drawing Sheets

(56)                    References Cited

OTHER PUBLICATIONS

Big ANN Benchmarks, "NeurIPS'21 Competition Track," date unknown, 4 pages, [Online] [Retrieved on May 7, 2025] Retrieved from the Internet <URL: https://big-ann-benchmarks.com/neurips21.html>.

Big ANN Benchmarks, "NeurIPS'23 Competition Track," date unknown, 7 pages, [Online] [Retrieved on May 7, 2025] Retrieved from the Internet <URL: https://big-ann-benchmarks.com/neurips23.html >.

GitHub, "Lance IVF Index," date unknown, 65 pages, [Online] [Retrieved on May 7, 2025] Retrieved from the Internet <URL https://github.com/lancedb/lance/blob/main/rust/lance/src/index/vector/ivf.rs#L1210 >.

GitHub, "Lance IVF Index," date unknown, 57 pages, [Online] [Retrieved on May 7, 2025] Retrieved from the Internet <URL lance/rust/lance/src/index/vector/ivf.rs at 48543099ed8d31-403e1aca6a4cff6bd3999dba0d · lancedb/lance · GitHub >.

GitHub, "Lance IVF Index," date unknown, 65 pages, [Online] [Retrieved on May 7, 2025] Retrieved from the Internet < URL lance/rust/lance/src/index/vector/ivf.rs at main · lancedb/lance · GitHub>.

GitHub, "Lance IVF Index Builder," date unknown, 7 pages, [Online] [Retrieved on May 7, 2025] Retrieved from the Internet <URL https://github.com/lancedb/lance/blob/68093581ef-5b8ef5be614d3e9ba19a4202734058/rust/lance/src/index/vector/ivf/builder.rs#L49 >.

GitHub, "Lance IVF Index Shuffler," date unknown, 19 pages, [Online] [Retrieved on May 7, 2025] Retrieved from the Internet <URL https://github.com/lancedb/lance/blob/68093581ef-5b8ef5be614d3e9ba19a4202734058/rust/lance-index/src/vector/ivf/shuffler.rs#L76 >.

GitHub, "Lance PQ Index," date unknown 16 pages, [Online] [Retrieved on May 7, 2025] Retrieved from the Internet <URL https://github.com/lancedb/lance/blob/main/rust/lance/src/index/vector/pq.rs#L336 >.

GitHub, "Lance Plain Encoding," date unknown, 19 pages, [Online] [Retrieved on May 7, 2025] Retrieved from the Internet < URL https://github.com/lancedb/lance/blob/68093581ef5b8ef5be614d3e9ba19a4202734058/rust/lance-io/src/encodings/plain.rs#L4 >.

GitHub, "LanceDB Issue #1195," date unknown, 8 pages, [Online] [Retrieved on May 7, 2025] Retrieved from the Internet <URL: https://github.com/lancedb/lance/issues/1195#issuecomment-2228924616>.

GitHub, "Lance DB Repository," date unknown, 7, [Online] [Retrieved on May 7, 2025] Retrieved from the Internet <URL: https://github.com/lancedb/lance>.

GitHub, "Nimble Repository," date unknown, 4 pages, [Online] [Retrieved on May 7, 2025] Retrieved from the Internet <URL: https://github.com/facebookincubator/nimble >.

JAX-ML, "JAX: Composable transformations of Python+NumPy programs," date unknown, 9 pages, [Online] [Retrieved on May 7, 2025] Retrieved from the Internet <URL https://github.com/jax-ml/jax >.

LanceDB, "A Primer on Lance," date unknown, 3 pages, [Online] [Retrieved on May 7, 2025] Retrieved from the Internet < https://lancedb.github.io/lancedb/concepts/data_management/#a-primer-on-lance >.

LanceDB, "Lance Format," date unknown, 23 pages [Online] [Retrieved on May 7, 2025] Retrieved from the Internet <URL https://lancedb.github.io/lance/format.html >.

LanceDB, "Read and Write Documentation," date unknown, 23 pages, [Online] [Retrieved on Apr. 10, 2025] Retrieved from the Internet <URL: https://lancedb.github.io/lance/read_and_write.html#filter-push-down >.

OpenXLA Project, "XLA," date unknown, 2 pages, [Online] [Retrieved on May 7, 2025] Retrieved from the Internet <URL https://openxla.org/xla >.

United States Office Action, U.S. Appl. No. 19/041,916 dated Jan. 26, 2026, 17 pages.

Patent Cooperation Treaty, International Search Report and Written Opinion, PCT Application No. PCT/US2025/050159, dated Dec. 30, 2025, 17 pages.

* cited by examiner

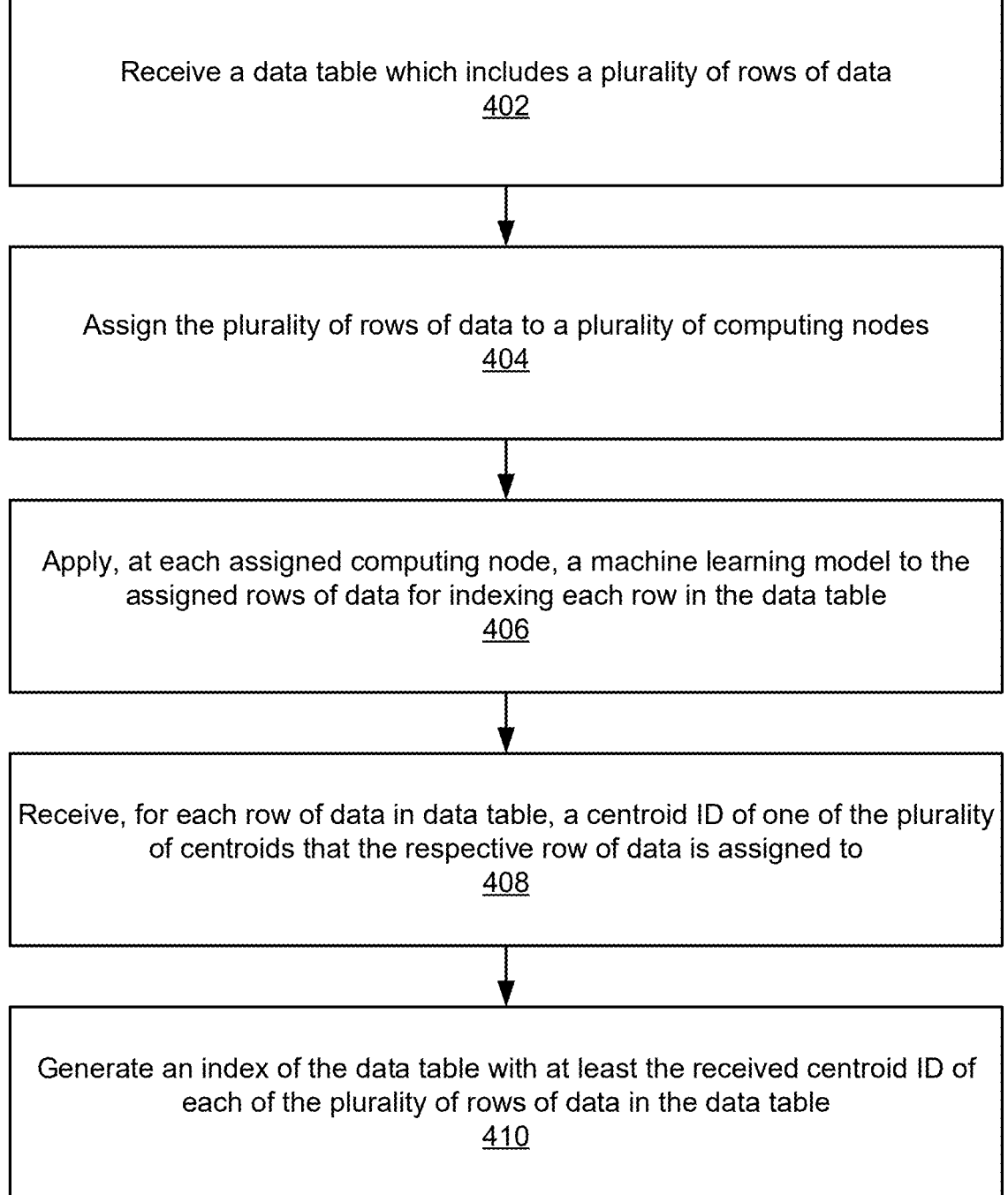

Receive a data table which includes a plurality of rows of data
402

Assign the plurality of rows of data to a plurality of computing nodes
404

Apply, at each assigned computing node, a machine learning model to the assigned rows of data for indexing each row in the data table
406

Receive, for each row of data in data table, a centroid ID of one of the plurality of centroids that the respective row of data is assigned to
408

Generate an index of the data table with at least the received centroid ID of each of the plurality of rows of data in the data table
410

FIG. 4

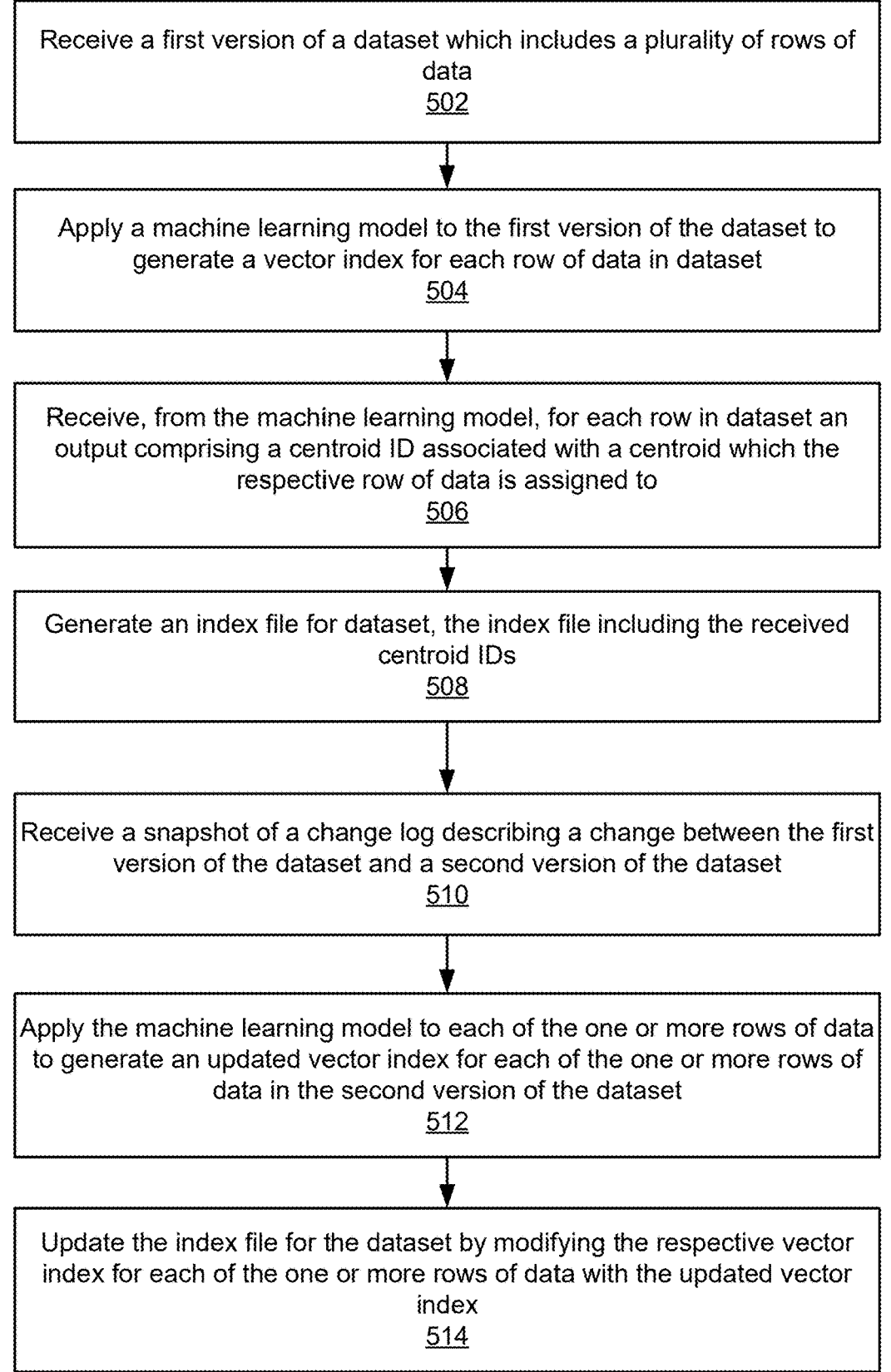

Receive a first version of a dataset which includes a plurality of rows of data
502

Apply a machine learning model to the first version of the dataset to generate a vector index for each row of data in dataset
504

Receive, from the machine learning model, for each row in dataset an output comprising a centroid ID associated with a centroid which the respective row of data is assigned to
506

Generate an index file for dataset, the index file including the received centroid IDs
508

Receive a snapshot of a change log describing a change between the first version of the dataset and a second version of the dataset
510

Apply the machine learning model to each of the one or more rows of data to generate an updated vector index for each of the one or more rows of data in the second version of the dataset
512

Update the index file for the dataset by modifying the respective vector index for each of the one or more rows of data with the updated vector index
514

FIG. 5

VECTOR INDEX BUILDING IN DISTRIBUTED COMPUTING SYSTEM

TECHNICAL FIELD

The disclosed configuration relates generally to database, and more particularly to vector index building in distributed computing system.

BACKGROUND

A data processing service may manage a significant amount of data for one or more entities in various forms, such as raw data or data tables. Users access the data processing service to perform operations (e.g., a query operation) on the data. In some cases, a data processing service may use a vector indexed database to store and retrieve data in vector form, typically numerical arrays that represent complex, unstructured data like text, images, or audio. These vector indexed databases use models to perform similarity searches, making them ideal for applications like recommendation systems or artificial intelligence (AI) powered search engines. However, providing a vector indexed database may require the data processing service to efficiently manage millions or even billions of vectors, and the associated computational and storage requirements can quickly escalate costs. The ability to scale to handle large datasets, such as 1 billion vectors, is a challenge to the current vector indexed databases. Large index sizes increase storage requirements and degrade query performance if not managed properly. Additionally, high-dimensional vectors consume a lot of memory. As the number of vectors increases, to handle the additional load efficiently, the data processing service often requires expensive memory upgrades or distributed architectures. Further, index structures, such as graph-based or clustering-based indexes, are dynamic in that they continually grow in size as more vectors are added. This increases strain on, and costs of, processing resources to properly maintain and update the indexes.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a data processing service, in accordance with an embodiment.

FIG. 4 is a flowchart of a method for building vector indices in a distributed computing system, in accordance with an embodiment.

FIG. 5 is a flowchart of a method for incrementally updating vector indices in a distributed system, in accordance with an embodiment.

DETAILED DESCRIPTION

Figure 1:
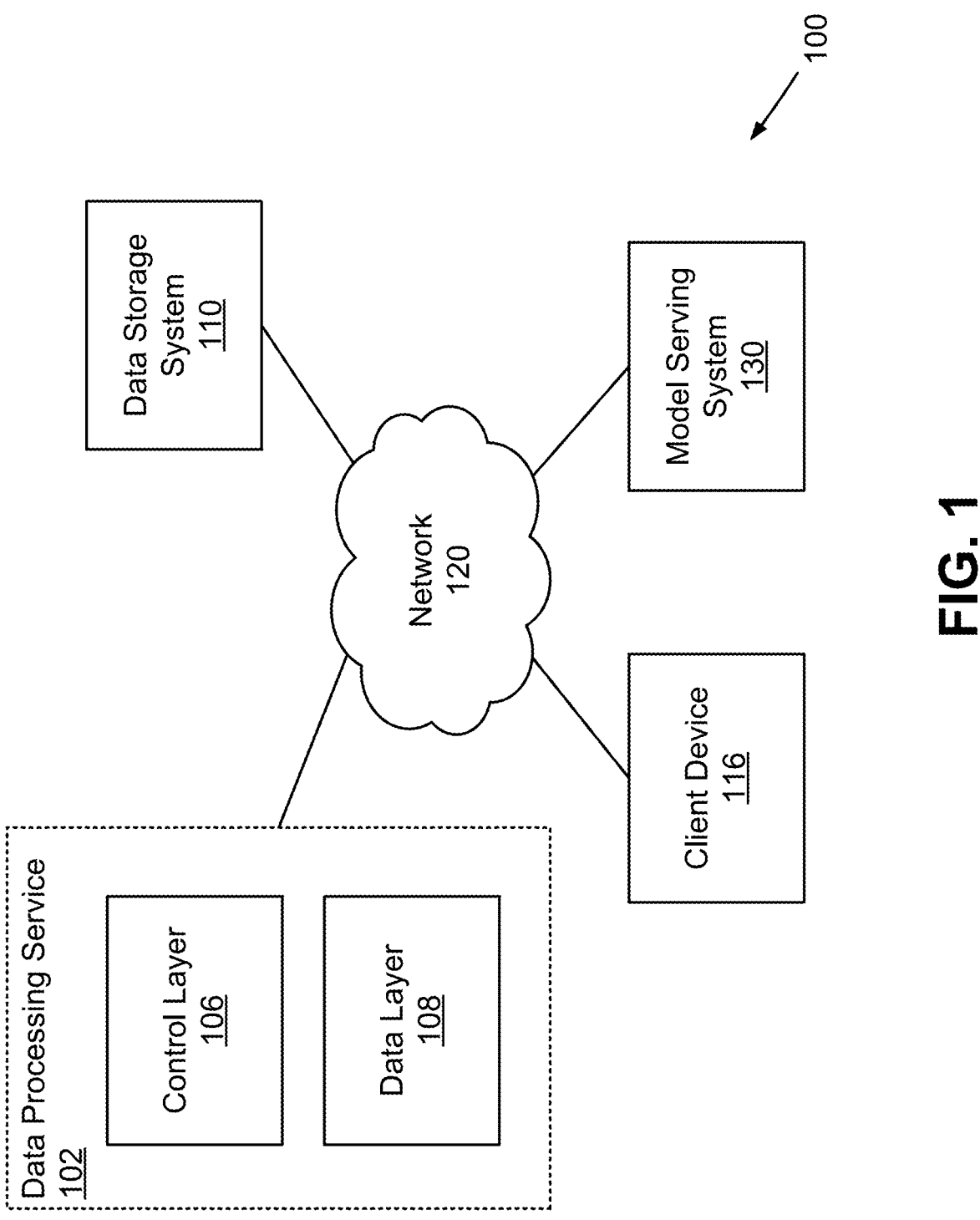

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DISCLOSURE OVERVIEW

The disclosed configuration provides a system (and/or a computer-readable medium or method/process) for building vector indices in a distributed computing system. The configuration receives a data table which includes a plurality of rows of data. The configuration assigns the plurality of rows of data to a plurality of computing nodes. The computing nodes belongs to a distributed computing system. At each assigned computing node, the configuration applies a machine learning (ML) model to the assigned rows of data for indexing each row in the data table. The ML model is trained to determine a set of centroids, and each centroid is associated with a centroid ID. For each row of data in the data table, the configuration receives a centroid ID of one of the plurality of centroids that the respective row of data is assigned to. The configuration generates an index of the data table with at least the received centroid ID of each of the plurality of row of data in the data table.

In another aspect, the disclosed configuration provides a system (and/or a computer-readable medium or method/process) for incrementally updating vector indices in a distributed computing system. The configuration receives a first version of a dataset which includes a plurality of rows of data. The configuration applies a machine learning model to the dataset to generate a vector index for each row of data in the dataset and receives a centroid ID for each row of data. The centroid ID is associated with a centroid which the respective row of data is assigned to. The configuration generates an index file for the dataset using the received centroid IDs. The configuration receives a snapshot of a change log describing a change between the first version of the dataset and a second version of the dataset. One or more rows of data in the second version of the dataset may be different from one or more respective rows of data in the first version of the dataset. The configuration applies the machine learning model to each of the one or more rows and generates an updated vector index for each of the one or more rows of data in the second version of the dataset. The configuration updates the index file for the dataset by modifying the respective vector index for each of the one or more rows of data with the updated vector index.

Figure (FIG. 1 is a high-level block diagram of an example system environment 100 for a data processing service 102, in accordance with an embodiment. The system environment 100 shown by FIG. 1 includes one or more client devices 116, a network 120, a data processing service 102, and a data storage system 110. In alternative configurations, different and/or additional components may be included in the system environment 100. The computing systems of the system environment 100 may include some or all of the components (systems (or subsystems)) of a computer system 600 as described with FIG. 6. In some embodiments, the computing devices may be configured with software to function as specifically described herein. For example, program code comprised of instructions may cause a processing system to be structured in a manner so that the device operates the specific functionality upon execution of the program code.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. In one embodiment, the requests may include machine learning and artificial intelligence (AI) related requests on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116.

The data layer 108 includes computing resources that execute one or more tasks or jobs received from the control layer 106. Accordingly, the data layer 108 may include compute resources for executing the jobs. An example of a compute resource is described in relation to FIG. 3. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, the compute resources are configured with one or more hardware accelerators, such as graphic processor units (GPUs), tensor processor units (TPUs), neural processing units (NPUs) that can accelerate the training or inference process of large-scale machine learning models or AI models. Computing architecture that may be used with such hardware accelerators may involve some or all of the components of a computer system as described with FIG. 6. The data layer 108 may include resources not available to a developer on a local development system, such as powerful computing resources to process very large data sets.

The data storage system 110 includes a device (e.g., a disc drive, a hard drive, a semiconductor memory) used for storing database data (e.g., a stored data set, at least a portion of a stored data set, data for executing a query). The data storage system 110 may store data in the format of data tables, unstructured or structured data, and the like, that can be used to train or perform inference using the machine learning models described herein. For example, the data storage system 110 may store significant amounts of training data that can be used to train or fine tune parameters of machine learning models. In one embodiment, the data storage system 110 may also store trained models (e.g., parameters of the models) that have been trained by compute resources of the data processing service 102.

In one embodiment, the data storage system 110 includes a distributed storage system for storing data and may include a commercially provided distributed storage system service. Thus, the data storage system 110 may be managed by a separate entity than an entity that manages the data processing service 102, for example, a customer or user of the data processing service 102. In another embodiment, the data management system 110 may be managed by the same entity that manages the data processing service 102. Thus, coupled with the serverless implementation of compute resources of the data layer 108, the data processing service 102 may manage access controls to user data stored in the data storage system 110, maintenance tasks for the user data, and the like so that an entity user of the data processing service 102 without separately configuring and deploying infrastructure.

The client devices 116 are computing devices that display information to users and communicates user actions to the systems of the system environment 100. While one client devices 116 is illustrated in FIG. 1, in practice many client devices 116 may communicate with the systems of the system environment 100. In one embodiment, client devices 116 of the system environment 100 may include some or all of the components (systems (or subsystems)) of a computer system 600 as described with FIG. 6.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

The model serving system 130 includes resources for deploying one or more machine learning models. In one instance, the machine learning models are large-scale models with a significant number of weights or parameters. The models may be configured to perform natural language processing (NLP) tasks, audio processing tasks, image processing tasks, video processing tasks, and the like. For example, given a prompt, a model may generate a response or expand on the prompt in a human-like text. In one embodiment, the model serving system 130 receives input data (e.g., text data, audio data, image data, or video data) and encodes the input data into a set of input tokens. The model serving system 130 applies the machine learning model to generate the output data (e.g., text data, audio data, image data, or video data) including a set of output tokens.

In one embodiment, the machine learning models are configured as a transformer neural network architecture including one or more attention layers. However, it is appreciated that in other embodiments, the machine learning models can be configured as any other appropriate architecture including, but not limited to, long short-term memory (LSTM) networks, Markov networks, BART, generative-adversarial networks (GAN), diffusion models (e.g., Diffusion-LM), and the like.

In one embodiment, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the language models are large-scale models that are trained on a large corpus of training data (e.g., texts, images, audio, or video). For example, when the model is an LLM, the LLM may be trained on massive amounts of text data, often involving millions or billions of words or text units. The large amount of training data from various data sources allows the LLM to generate outputs for many inference tasks. A machine learning model may have a significant number of parameters in a deep neural network (e.g., transformer architecture), for example, at least 1 billion, at least 50 billion, at least 100 billion, at least 500 billion, at least 1 trillion, at least 2 trillion parameters.

Since the parameter size and the amount of computational power for training or performing inference on the machine learning models may be significantly high, in one embodiment, the model serving system 130 is configured an infrastructure configured with, for example, supercomputers that provide enhanced computing capability via one or more hardware accelerators, such as graphic processor units (GPUs), tensor processor units (TPUs), and/or neural processor units (NPUs). In one instance, the models may be trained and hosted on a cloud infrastructure service provided by the data processing service 102.

Current data processing services may use distributed computing systems for vector indexing, which addresses the limitations of single-node systems, such as storage and computational constraints. Using distributed systems to build a scalable and efficient vector-indexed database involves breaking down the workload into smaller, manageable components and distributing them across multiple computing resources or nodes. For example, a distributed system allows the data to be partitioned across multiple nodes, and each node handles only a subset, thus reducing the memory and computational load on individual machines. Distributed systems can leverage commodity hardware or cloud infrastructure, which is often more cost-effective than scaling up a single high-performance machine. Additionally, elastic scaling allows the system to optimize resource usage and reduce costs during periods of lower demand.

However, in a distributed system, when data is distributed across multiple nodes, the data structure, relationships and organizational patterns inherent in the vector data can be disrupted. These structures depend on the spatial and relational properties of vectors, such as their proximity or similarity in the vector space. For instance, vectors that are similar and connected in the original index may be stored on different nodes, breaking the structure of clusters or graph connections. Additionally, in distributed systems, each node often maintains its own local index, which may lack awareness of global relationships between vectors. As a result, the system may lose the "big picture" of how the data is interconnected, leading to inefficiencies in query processing and inaccurate results. Further, query latency increases, as the system may need to query multiple nodes or dynamically reconstruct relationships between partitions during searches. This adds significant computational and network overhead.

Addressing these challenges requires preserving the data structure while maintaining scalability. One approach is to implement global coordination mechanisms, where relationships between vectors across nodes are tracked and maintained. In one embodiment, the system and method disclosed herein build vector indices in a distributed computing system. In one instance, the system builds a single vector index for an entire dataset. The system trains and deploys an indexing model to assign each data record in a large dataset to a centroid with a centroid ID. The assigned centroid ID is used for indexing the data record and generating an index file for the dataset. In this approach, the dataset is partitioned across multiple nodes, but the index itself remains logically global. Each node is responsible for indexing its local subset of data, but all nodes have access to all centroids and use the same indexing model.

In this way, the system builds a single vector index for an entire dataset by using a distributed system, which partitions the data across multiple nodes while ensuring that the relationships and structure of the index are preserved. It provides a unified view of the entire dataset, which ensures the system operates cohesively rather than as fragmented clusters. This unified representation allows queries to access all relevant data points across the distributed nodes, enabling accurate and comprehensive search results. For example, in a multi-node system, local indices may yield varying results depending on where a query is processed. With a single vector index, the results are consistent across the system, fostering a seamless and reliable user experience. A single vector index also allows the system to optimize query routing and execution by identifying the most relevant portions of the dataset to search. This reduces unnecessary lookups in irrelevant nodes, thereby reducing latency and computational overhead. The global structure of the dataset is preserved in the index so that targeted searches require fewer I/O operations and less network communication, ultimately improving performance.

In another aspect, updating vector indices in a vector indexed database system, especially in distributed systems, can be quite complex. The difficulties stem from the need to maintain the integrity, performance, and consistency of the index as data evolves. When new vectors are added or existing vectors are removed, the underlying index needs to be updated to reflect these changes. For example, adding a new vector may require recalculating nearest neighbor relationships, adjusting data structures (such as trees or graphs), or modifying partitioning schemes. If the index is not updated correctly, search queries may return incorrect or incomplete results. In a distributed system, keeping the index consistent across multiple nodes is also challenging. Updates to the vector indices need to be synchronized between nodes to ensure that all nodes reflect the same data.

Inconsistent updates may result in queries returning inaccurate results or slower performance.

Implementing efficient incremental indexing methods, where only the affected parts of the index are updated, rather than rebuilding the entire index, may reduce the impact on performance. Incremental updates refer to the process of updating an index progressively, rather than rebuilding the entire index from scratch. This approach is crucial in vector databases, especially when dealing with large and continuously changing datasets, such as recommendation systems, image search platforms, or real-time applications. Incremental updates may efficiently modify the index by only adjusting parts of it that are directly affected by the updates, reducing both time and computational costs. In one embodiment, the system and method disclosed herein incrementally update vector indices in a distributed computing system. The system uses a snapshot of a change log describing a change between a first version of the dataset and a second version of the dataset. The system applies a machine learning model to the changed data records in the second version of the dataset and generates an updated vector index for each of the changed data records in the second version of the dataset. The system updates the index file for the dataset by modifying the respective vector index for each of the changed data records.

Using a snapshot of a change log to describe changes between versions of datasets offers several benefits when incrementally updating vector indices. The change log serves as a record of which parts of the dataset have been added, modified, or removed. By utilizing this log, vector indexing systems can efficiently update the vector index without needing to rebuild the entire index from scratch. Specifically, using a snapshot of a change log allows for efficient updates by minimizing computational overhead and focusing only on affected parts of the index, reducing latency and maintaining fast query response times. This approach supports non-disruptive updates, for example, the vector indices may remain operational while being updated. It reduces storage and memory costs by only storing the changes rather than full index versions, and provides easier rollbacks and versioning, allowing for quick recovery or rebuilding of the index from previous states. Furthermore, the disclosed method supports scalability, which hands large datasets and distributed systems. In this way, the vector indexed database may grow without impacting on performance.

Figure 2:
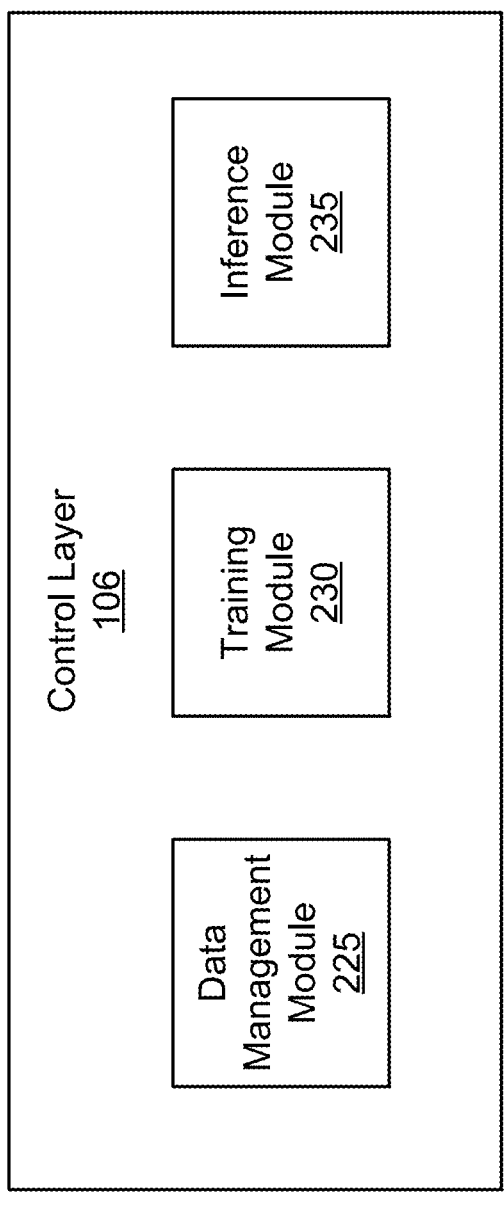
FIG. 2 illustrates a block diagram of an architecture of a control layer 106, in accordance with an embodiment.

FIG. 2 is a block diagram of an example architecture of a control layer 106, in accordance with an embodiment. In one embodiment, the control layer 106 includes a data management module 225, a training module 230, and/or an inference module 235.

The data management module 225 generates and manages the training datasets for training one or more machine learning models that are to be deployed on the model serving system 130 and/or on other systems by the data processing service 102. In one instance, the training dataset may be stored or is constructed from data stored in the data storage system 110. In one embodiment, for a given model to be trained, the data management module 225 obtains a training dataset including a set of training instances. For example, a training instance includes inputs and known outputs for the inputs. In one example, the inputs for a training instance may be a plurality data records in a database, e.g., a plurality of rows of data in a data table and the known outputs may be centroid IDs associated with a set of centroids.

In one embodiment, as the machine learning models are deployed and users perform inference using the machine learning models, the data management module 225 may obtain feedback from users with respect to the outputs that were generated by the machine learning models during the inference process. In such an embodiment, the data management module 225 obtains feedback to determine whether the feedback is positive or negative, and the data management module 225 may update the training dataset to include training instances where the outputs were known to have positive feedback from the user. The updated training dataset may then be used to fine-tune parameters of the machine learning models.

The training module 230 instructs and coordinates training of one or more machine learning models. In one embodiment, the training module 230 coordinates training on compute resources of the data layer 108 that are configured with multiple hardware accelerators to accelerate the training process of large-scale models.

Figure 3:
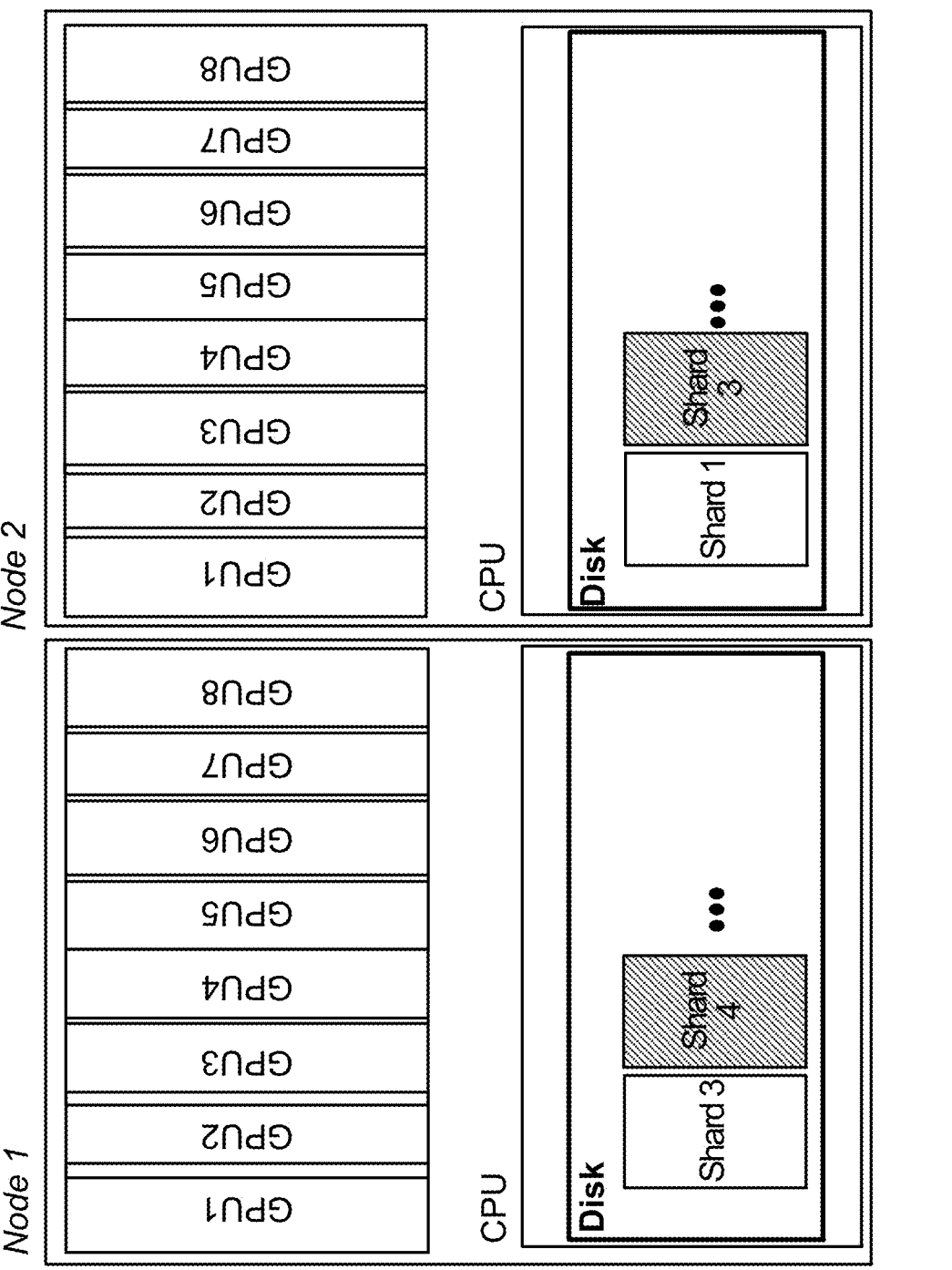
FIG. 3 illustrates a block diagram of an architecture of a compute resource, in accordance with an embodiment.

FIG. 3 illustrates a block diagram of an architecture of a compute resource, in accordance with an embodiment. In one embodiment, the compute resource of the data layer 108 is configured with one or more nodes. A server node may include one or more central processing units (CPUs) and one or more hardware accelerators. In the example shown in FIG. 3, the hardware accelerators are configured as graphic processor units (GPUs), but it is appreciated that in other embodiments, the hardware accelerators may be configured as a different type of accelerator. In the implementation shown in FIG. 3, one node has eight GPUs.

Each GPU may be configured with high-bandwidth memory (HBM) and local memory (e.g., SRAM) to store data such as model parameters, intermediate states, and the like during training and inference.

The inference module 235 may obtain one or more trained machine learning models and manage processing requests for inference using the trained model. In one embodiment, a trained model is deployed on a model serving system 130. The inference module 235 may configure and manage interfaces such as application programming interface (APIs) or gRPC interfaces, so that users can submit requests to the interface. The requests may include inputs and the model may be applied to the inputs to generate outputs. The outputs are provided back to the users as a response to the request.
Example Vector Index Building in Distributed Computing System In one embodiment, the data processing service 102 builds a vector indexed database using a distributed computing system. The distributed computing system may include a set of nodes (e.g., computing clusters), and the data processing service 102 partitions data records across multiple nodes and trains the indexing model that learns how to associate data records (or vectors) with the most appropriate centroids. The data processing service 102 uses the trained indexing model to assign data records to cluster (e.g., centroids) for indexing.

In some embodiments, the data processing service 102 trains an indexing model based on a training dataset which includes a plurality of training samples. In some implementations, the data processing service 102 (e.g., data management module 225) may access a data store (e.g., data storage system 110) to generate the training dataset for training the indexing model and the generated training dataset may be stored in the data storage system 110. In one example configuration, the data management module 225 may access a plurality of data records and generate a training sample for each data records. For example, the data processing service 102 may access a data table that includes a plurality of rows of data, and each row of data is a data record. The data management module 225 may generate a plurality of training samples, each training sample corresponding to one row of data. The data management module 225 may generate an embedding vector to represent each training sample (e.g., row of data). Generating embedding vectors is a process of converting data (such as, text, images, structured data, etc.) into numerical representations in a high-dimensional space. Embedding vectors may be used to capture underlying characteristics, structure, and relationships in a high-dimensional vector space. When embeddings are created, each data record (e.g., training sample) is transformed into a fixed-length vector in a high-dimensional space and are used for vector indexing.

In some embodiments, the data management module 225 may shuffle the training samples to randomly re-order the samples in training dataset to break any inherent patterns, biases, or order influence that the training samples may process. The data management module 225 partitions the dataset into subsets by dividing the shuffled samples into smaller subsets, where each subset contains a specific portion of the samples. In one implementation, the data management module 225 may use reservoir sampling to generate subsets of training samples. Reservoir sampling is an algorithm used for random sampling from a stream of data records, where the total size is unknown or too large to fit into memory. The data management module 225 may maintain fixed-size reservoirs (e.g., subsets) to store the samples, regardless of the stream's length. As a new data record arrives, the data management module 225 randomly adds the new data record to a reservoir with a probability that decreases as the stream progresses. In this way, every data record in the stream has an equal chance of being included in the sample. The data management module 225 distributes the partitioned subsets of samples across the plurality of nodes in the distributed computing system. Each node performs clustering on its portion of the samples using parallel processing so that training the indexing model is performed simultaneously on different computing nodes.

In some embodiments, the training module 230 of the data processing service 102 may train the indexing model by clustering the training samples and determining the centroids for the training samples. The centroid is the mean value of all the samples that belong to that cluster. In one instance, the training module 230 may use K-Means algorithm to determine the centroids that represent the underlying clusters within the training samples. The K-Means training process iteratively assigns the samples to the nearest centroid, recalculates the centroids based on these assignments, and repeats the process until convergence (i.e., when the centroids no longer change significantly, or the change in the centroids between two successive iterations meets a predetermined condition). In some embodiments, the training module 230 may begin with an initialization of centroids, where one or more data points are selected as the starting cluster centers. The training module 230 may initialize the centroids randomly and assign each training sample to at least one of the centroids. For example, the training module 230 may assign each training sample to the nearest centroid based on a chosen distance metric, for example, Euclidean distance. For each training sample, the distance to all centroids is calculated, and the training sample is assigned to the cluster of the closest centroid. This forms the initial clusters, grouping training samples around their respective centroids. Each node works on its own subset of training samples and also accesses all the centroids for accurate centroid assignment. Each node calculates which centroid is closest to each of its local samples by computing the distance between the samples and all centroids. Once the nearest centroid for each sample is identified, the node assigns the sample to that centroid. In some implementations, the training module 230 may perform a global aggregation to combine the local results from all the nodes and broadcast the aggregation to all computing nodes.

In some embodiments, the training module 230 may perform iteratively training process, where the centroids are recalculated to better reflect the mean position of the training samples within each cluster. The new centroid is computed as the average of all points assigned to that cluster, ensuring that the centroids move closer to the true center of the data they represent. In some embodiments, in each iteration, the data management module 225 may re-shuffle and/or re-partition the training dataset to generate a new set of training subsets, and each training subset may be randomly distributed to one of the plurality of computing nodes for performing the training process in the respective iteration. The training process may be repeated iteratively until the algorithm converges. Convergence may be achieved when the centroids stabilize, for example, the centroids no longer change significantly between iterations, or when a predefined maximum number of iterations is reached. At the end of the training process, the final centroids are output as the cluster centers. These centroids may be used to cluster new data records. In some embodiments, the training module 230 may materialize the output centroids, e.g., storing the output centroids in a data store, e.g., the data storage system 110 of the data processing service 102.

In some embodiments, the training module 230 may integrate product quantization (PQ) with the K-Means training. PQ is a technique used to compress high-dimensional data for more efficient storage and retrieval, particularly in approximate nearest neighbor (ANN) search systems. The K-Means algorithm works by clustering the high-dimensional data points (e.g., embedding vectors that represent the samples/data records) into clusters and then calculating the centroids of these clusters. These centroids act as representative points for the data points in each cluster. Once these centroids are computed, they can be used for subsequent stages like PQ. In PQ, the vector space is divided into multiple smaller subspaces (e.g., codebooks), and each subspace has its own set of centroids, created through independent K-Means clustering. In some implementations, the training module 230 may train a PQ codebook with K Means algorithm. In one instance, the training module 230 may use residual vectors to train a PQ codebook. A residual vector is calculated as the difference between the original data point (embedding vector representing the data record) and its assigned centroid. The residual vector represents the "error" or "difference" between the data point and its assigned cluster center. This residual vector is then quantized using the PQ codebook, which is trained separately for different subspaces of the residual vector. After the K-Means clustering or PQ codebook training, the training module 230 may create an index that stores the learned centroids or codebook entries. In some embodiments, the index may include a centroid ID and a PQ code for representing the respective data record.

With the materialized centroids, the inference module 235 assigns data records to their respective centroids. In one instance, the inference module 235 may access a data table which includes a plurality of rows of data. The inference module 235 may generate an embedding vector to represent each row of data. In some examples, the data table may include a large number of data records, e.g., 1 billion data records. The inference module 235 may assign the plurality of data records into one or more batches, and each batch may include a pre-determined size, e.g., 10,000 data records per batch, indicating that the inference module 235 may assign centroids and compute PQ codes for 10,000 data records simultaneously, with each node handling a portion of the batch.

For each batch, the inference module 235 determines which centroid (or cluster) each data record belongs to. The inference module 235 may compute a distance between the data record and each of the centroids that were precomputed during the K-Means training process. The inference module 235 may assign each data record to the centroid that has the smallest distance from it. This assignment step is repeated for all 10,000 data records in the batch. In some embodiments, the inference module 235 may output a list of centroid IDs, where each data record is associated with the index of the centroid to which it belongs. These centroid IDs may be used to group the data records into clusters for further processing. In some embodiments, the inference module 235 may further compress the data records using a PQ codebook. For each data record in the batch, after determining which centroid it belongs to, the inference module 235 computes the PQ code to compress the data record into a smaller, compact representation. In some implementations, the PQ code for each data record is computed based on its distance to the closest centroids in the PQ codebook.

The data processing service 102 may generate an index file for all the data records in a dataset. For instance, the data processing service 102 may aggregate the local results from each node, e.g., the centroid IDs and PQ codes for each data record from the respective computing node. The index file includes the centroid IDs and PQ codes for each data record of the entire datasets (e.g., each row of data in a data table). The data records may be sorted, filtered, searched based on their corresponding centroid IDs and/or PQ codes. In some embodiments, the data processing service 102 generates a single vector index with the centroid IDs and PQ codes, and the index file may be an aggregated vector index for the entire dataset. In some examples, the data processing service 102 may combine individual centroid ID and PQ code for each data record in the dataset into a single vector index using methods like averaging, weighting, dimensionality reduction, or neural network-based aggregation. With the single vector index, each data record may be identifiable with its centroid ID and PQ code. In some embodiments, the data processing service 102 may broadcast the generated index file (e.g., the single vector index) to all computing nodes in the distributed computing system so that each computing node has access to the index file for the entire dataset. Transmitting a single vector instead of full data records may improve efficiency and enhance privacy while sharing aggregated information in a distributed system. In some embodiments, the generated index file may be stored at data storage system 110. The single vector index provides a condensed representation that scales efficiently for tasks like clustering, classification, or retrieval. For example, in a vector search engine, the single vector index may be compared with a query vector to decide if the dataset is relevant. A single vector index allows for quick similarity computations between datasets or queries, reducing the need to compare individual records and speeding up pre-filtering and ranking in vector search engines.

In some embodiments, the data processing service 102 may generate a dataset with the assigned data records. In some implementations, the data processing service 102 may partition the dataset in inverted file index (IVF) partitions.

Each IVF partition may contain data records that are closest to a specific centroid. In this way, the data records within the same partition are stored in close proximity, logically and/or physically. In this way, the data records may be sorted by centroid IDs so that all the data records associated with the same centroid are grouped together. In some implementations, the data processing service 102 may generate an index file that includes the centroid IDs and/or PQ codes for the respective rows of data in the data table. In some implementations, the data processing service 102 may generate a dataset that includes the original rows of data and the vector indices (e.g., centroid IDs and PQ codes) of the respective rows of data. The dataset may be sorted, filtered, and/or searched based at least on the vector indices.

In some embodiments, the data processing service 102 may generate secondary indices for the dataset. A secondary index is an additional index that is created on columns in a database to facilitate faster lookups, queries, or operations on those columns. In some implementations, the secondary indices may include embedding indexing and/or metadata indexing. Embedding indexing allows for quick similarity search based on the content (e.g., finding similar products, documents, or images). Metadata indexing enables filtering or sorting based on non-embedding attributes like price, category, or date, which can be particularly important for narrowing down results after the nearest neighbors are found.

Incrementally Updating Vector Indices with Change Log

In some embodiments, the data processing service 102 may incrementally update the vector indices. To handle changes in large datasets that require frequent updates, the data processing service 102 may incrementally update the vector indices without rebuilding the entire dataset or index from scratch. Incremental updates allow for adding, removing, or modifying data in a more efficient manner by focusing only on the parts of the data that have changed, rather than reprocessing the entire dataset.

In some embodiments, the data processing service 102 may use a change log to track modifications made to a dataset over time, including additions, deletions, and modifications. It captures the changes at a granular level, detailing the specific data points that have been altered since the last update. In one example, each entry in a change log includes metadata such as, record ID, which identifies the specific data record, the operation type (e.g., add, update, delete), and a timestamp marking when the change occurred. If the data record was updated, the change log may also capture both the old and new values of the data record.

Once changes in the data records are identified, the data processing service 102 may update the vector indices to reflect the changes. When a new data record (like an embedding vector) is added, the data processing service 102 may apply the indexing model to the new data record (or the embedding vector representing the new data record) to determine which cluster or centroid the new vector belongs to, based on its similarity to existing data records. For example, the data processing service 102 may determine the nearest centroid or the most similar data records using algorithms like K Means clustering or K Nearest Neighbors (K-NN). For example, with IVF partitions, the data processing service 102 may assign the new data record to a specific partition based on the centroid closest to the new data record. If the partition does not already exist, the data processing service 102 may create a new IVF partition dynamically. In the case of quantized vector indexes, the new data record may be encoded according to an existing codebook, e.g., PQ codebook. For a modified data record, the data processing service 102 may recalculate the index to account for new vector positions or cluster assignments. The modified data record may need to be reassigned to a different centroid or partition, especially if it becomes more similar to data records from another cluster. In some implementations, if the change of the data record is significant enough, the data processing service 102 may assign the modified data record to another cluster/centroid, which may require modifying the clustering structure or recalculating the distances between vectors/data records. When data records are deleted (e.g., removing outdated or erroneous vectors), the data processing service 102 updates the index to ensure that the deleted data record no longer exists within the index. If the deleted data record was central to a cluster, this may necessitate re-clustering or adjusting the cluster to maintain its integrity. In some cases, if a centroid no longer has sufficient data records, the data processing service 102 may merge it with a neighboring centroid or repartition the dataset.

The data processing service 102 may perform the incremental update based on use case, data characteristics, system requirements, and the like. In one implementation, the data processing service 102 may perform time-based updates. For example, the incremental update may be performed in real-time or near real-time (every few seconds or minutes) for systems requiring high freshness. Alternatively, the update may be performed periodically, such as daily, weekly, or monthly. The data processing service 102 may receive one or more versions of change logs, aggregate the changes in the change logs and update the vector index with a pre-determined time interval. In some implementations, the vector index update may be triggered based on specific events or thresholds in the dataset. For instance, an update may occur when a certain percentage or number of data records is added, modified, or deleted (e.g., 5% of the dataset). Specific events such as the arrival of new data, deletions, or modifications to metadata or embeddings may also act as triggers. In some implementations, the vector index update may be triggered based on user queries or system demands, thresholds of data volume, etc. For example, an update may occur when a batch of new data records reaches a predefined size (e.g., 1,000 new data records) or when the data volume exceeds a certain storage threshold.

In some implementations, the data processing service 102 may update the vector indices using a distributed computing system. For example, change logs may be useful for decentralized processing. Once changes to the data records are tracked, the data processing service 102 propagates these updates to the relevant nodes. In one example, data records are partitioned across nodes based on keys, centroids, or other criteria. The data processing service 102 may determine which partitions or nodes are affected by the changes in the change log and send the necessary updates to those nodes only. In some embodiments, each node in the distributed system may track its own changes locally and keep a local change log. These logs may be synchronized among the nodes in the distributed system to ensure consistency across the entire system.

Example Process of Building Vector Index in Distributed Computing System

FIG. 4 is a flowchart of an example method for building vector indices in a distributed computing system, in accordance with an embodiment. The process shown in FIG. 4 may be performed by one or more components (e.g., the control layer 106 or compute resources of the data layer 108) of a data processing system/service (e.g., the data processing service 102). Other entities may perform some or all of the steps in FIG. 4. The data processing service 102 as well as the other entities may include some or of the components of the machine (e.g., computer system) described in conjunction with FIG. 6. Embodiments may include different and/or additional steps, or perform the steps in different orders.

The data processing service 102 receives 402 a data table that includes a plurality of rows of data. The data processing service 102 may assign 404 the plurality of rows of data to a plurality of computing nodes. The plurality of computing nodes belongs to a distributed computing system. At each assigned computing node, the data processing service 102 may apply 406 a machine learning model to the assigned rows of data for indexing each row in the data table. In some embodiments, the data processing service 102 may generate an embedding vector to represent each row of data. The machine learning model may be a trained indexing model. Training the machine learning model may include accessing a plurality of samples to be processed over one or more iterations of training the machine learning model. The data processing service 102 may convert the sample to embedding vectors, and each embedding vector represents the corresponding sample in a latent space (e.g., a high-dimensional vector space). In each iteration, the data processing service 102 may shuffle and partition the plurality of samples into one or more sets of samples. The data processing service 102 may assign one or more sets of the samples to the plurality of computing nodes and apply, at each of the plurality of computing nodes, the machine learning model to the assigned sets to cluster the plurality of samples. The data processing service 102 may receive an output from the machine learning model. The output may include one or more centroids, and each centroid is clustered with a cluster of samples. The data processing service 102 may performs the one or more iterations of training the machine learning model to stabilize the plurality of centroids. The machine learning model is trained to determine a set of stabilized centroids, and each centroid is associated with a centroid ID. For each row of data in the source table, the data processing service 102 receives 408 a centroid ID of one of the plurality of centroids that the respective row of data is assigned to. The data processing service 102 generates 410 an index of the data table with at least the received centroid ID of each of the plurality of row of data in the data table.

Process of Incrementally Updating Vector Index

FIG. 5 is a flowchart of an example method for incrementally updating vector indices in a distributed system, in accordance with an embodiment. The process shown in FIG. 5 may be performed by one or more components (e.g., the control layer 106 or compute resources of the data layer 108) of a data processing system/service (e.g., the data processing service 102). Other entities may perform some or all of the steps in FIG. 5. The data processing service 102 as well as the other entities may include some or of the components of the machine (e.g., computer system) described in conjunction with FIG. 6. Embodiments may include different and/or additional steps or perform the steps in different orders.

The data processing service 102 receives 502 a first version of a dataset, and the dataset includes a plurality of rows of data. The data processing service 102 applies 504 a machine learning model to the dataset to generate a vector index for each row of data in the dataset. The machine learning model was trained to assign each row of data to a centroid of a plurality of centroids. The data processing service 102 receives 506, from the machine learning model, for each row in the dataset an output comprising a centroid ID associated with a centroid which the respective row of data is assigned to. The data processing service 102 generates 508 an index file for the dataset. The index file includes the received centroid IDs. The data processing service 102 receives 510 a snapshot of a change log describing a change between the first version of the dataset and a second version of the dataset. One or more rows of data in the second version of the dataset are different from one or more respective rows of data in the first version of the dataset. The data processing service 102 applies 512 the machine learning model to each of the one or more rows of data in the second version of the dataset described in the change log as different from the one or more respective rows of data in the first version of the dataset to generate an updated vector index for each of the one or more rows of data in the second version of the dataset. The data processing service 102 updates 514 the index file for the dataset by modifying the respective vector index for each of the one or more rows of data with the updated vector index.

Figure 6:
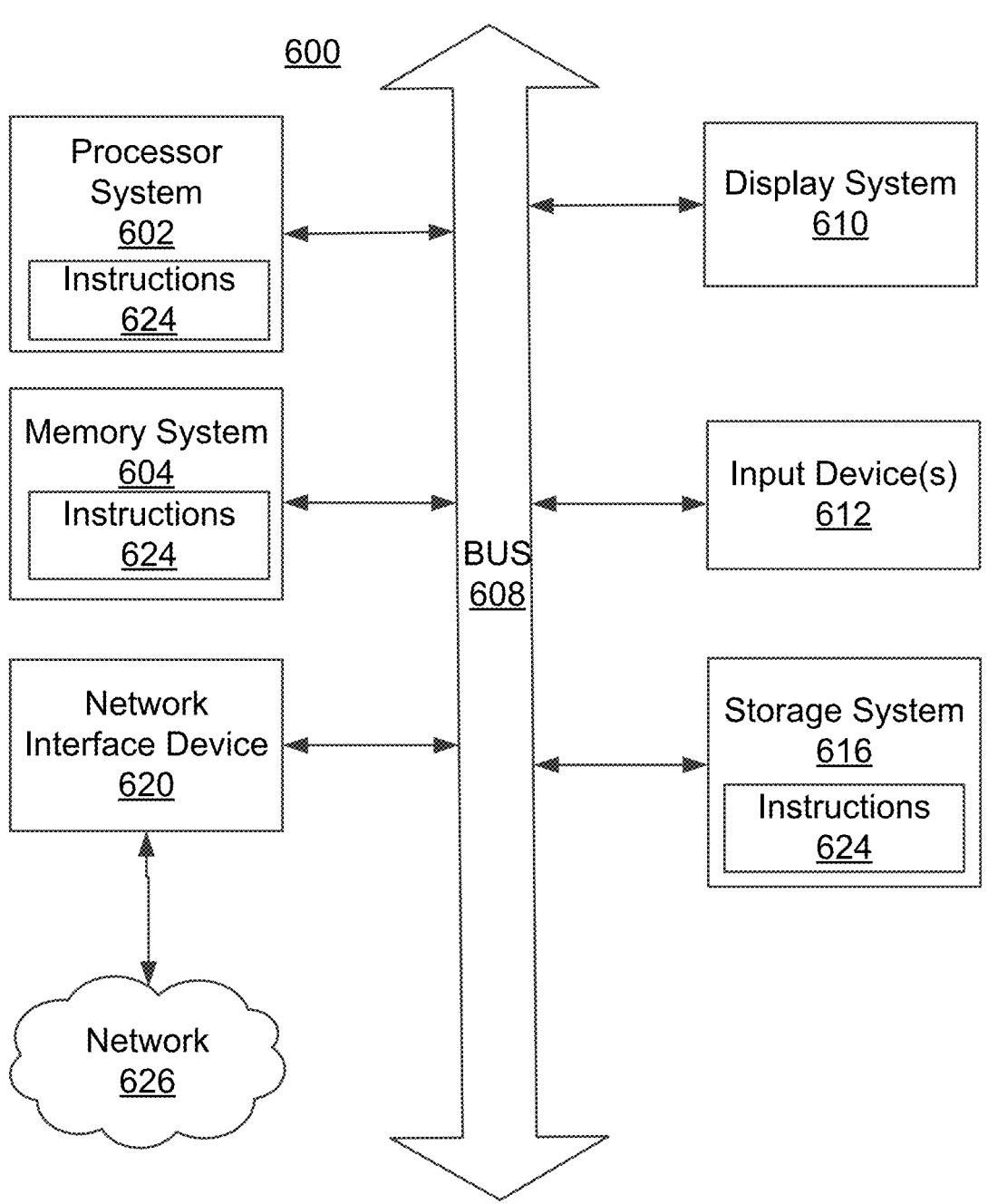
FIG. 6 is a block diagram illustrating an example machine to read and execute computer readable instructions, in accordance with an embodiment.

Turning now to FIG. 6, illustrated is an example machine to read and execute computer readable instructions, in accordance with an embodiment. Specifically, FIG. 6 shows a diagrammatic representation of the data processing service 102 (and/or data processing system) in the example form of a computer system 600. The computer system 600 is structured and configured to operate through one or more other systems (or subsystems) as described herein. The computer system 600 can be used to execute instructions 624 (e.g., program code or software) for causing the machine (or some or all of the components thereof) to perform any one or more of the methodologies (or processes) described herein. In executing the instructions, the computer system 600 operates in a specific manner as per the functionality described. The computer system 600 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 600 may be a server computer, a client computer, a personal computer (PC), a tablet PC, a smartphone, an internet of things (IoT) appliance, a network router, switch or bridge, or other machine capable of executing instructions 624 (sequential or otherwise) that enable actions as set forth by the instructions 624. Further, while only a single machine is illustrated, the term "machine" shall also be taken to include any collection of machines that individually or jointly execute instructions 624 to perform any one or more of the methodologies discussed herein.

The example computer system 600 includes a processing system 602. The processor system 602 includes one or more processors. The processor system 602 may include, for example, a central processing unit (CPU), a graphics processing unit (GPU), a tensor processing unit (TPU), a neural network processor (NPU), a digital signal processor (DSP), a controller, a state machine, one or more application specific integrated circuits (ASICs), one or more radio-frequency integrated circuits (RFICs), or any combination of these. The processor system 602 executes an operating system for the computing system 600. The computer system 600 also includes a memory system 604. The memory system 604 may include or more memories (e.g., dynamic random access memory (RAM), static RAM, cache memory). The computer system 600 may include a storage system 616 that includes one or more machine readable storage devices (e.g., magnetic disk drive, optical disk drive, solid state memory disk drive).

The storage unit 616 stores instructions 624 (e.g., software) embodying any one or more of the methodologies or functions described herein. The instructions 624 may also reside, completely or at least partially, within the memory system 604 or within the processing system 602 (e.g., within a processor cache memory) during execution thereof by the computer system 600, the main memory 604 and the processor system 602 also constituting machine-readable media. The instructions 624 may be transmitted or received over a network 626, such as the network 626, via the network interface device 620.

The storage system 616 should be taken to include a single medium or multiple media (e.g., a centralized or distributed database, or associated caches and servers communicatively coupled through the network interface system 620) able to store the instructions 624. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 600 can include a display system 610. The display system 610 may driver firmware (or code) to enable rendering on one or more visual devices, e.g., drive a plasma display panel (PDP), a liquid crystal display (LCD), or a projector. The computer system 600 also may include one or more input/output systems 612. The input/output (IO) systems 612 may include input devices (e.g., a keyboard, mouse (or trackpad), a pen (or stylus), microphone) or output devices (e.g., a speaker). The computer system 600 also may include a network interface system 620. The network interface system 620 may include one or more network devices that are configured to communicate with an external network 626. The external network 626 may be a wired (e.g., ethernet) or wireless (e.g., WiFi, BLUETOOTH, near field communication (NFC).

The processor system 602, the memory system 604, the storage system 616, the display system 610, the IO systems 612, and the network interface system 620 are communicatively coupled via a computing bus 608.

ADDITIONAL CONSIDERATIONS

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising:
receiving a data table, the data table comprising a plurality of rows of data;
assigning the plurality of rows of data to a plurality of computing nodes;
applying, at each assigned computing node, a machine learning model to the assigned rows of data for indexing each row in the data table, wherein training the machine learning model comprises:
accessing a plurality of samples to be processed over one or more iterations of training the machine learning model;
in each iteration,
shuffling the plurality of samples;
partitioning the plurality of samples into one or more sets, each set comprising a set of the samples;
assigning the one or more sets of samples to the plurality of computing nodes;
applying, at each of the plurality of computing nodes, the machine learning model to the assigned sets to cluster the plurality of samples; and
receiving an output from the machine learning model, the output comprising one or more centroids, each centroid clustered with a cluster of samples;

performing the one or more iterations of training the machine learning model to stabilize the plurality of centroids; and
determining a set of stabilized centroids, each centroid having a centroid ID;
receiving, for each row of data in the data table, a centroid ID of one of the plurality of centroids that the respective row of data is assigned to; and
generating an index of the data table with at least the received centroid ID of each of the plurality of rows of data in the data table.

2. The method of claim 1, wherein accessing a plurality of samples to be processed over one or more iterations of training the machine learning model comprises:
generating a plurality of embedding vectors, each embedding vector representing one of the plurality of samples.

3. The method of claim 1, wherein applying, at each of the plurality of computing nodes, the machine learning model to the assigned sets to cluster the plurality of samples comprises:
applying K-Means algorithm to each of the assigned set of samples; and
assigning each of the assigned set of samples to one of the one or more centroids, the one of the one or more centroids is a nearest centroid to the respective sample.

4. The method of claim 1, wherein performing the one or more iterations of training the machine learning model to stabilize the plurality of centroids comprises:
determining that a change in the plurality of centroids between two successive iterations meets a predetermined condition.

5. The method of claim 1, wherein generating an index of the data table comprises:
computing a product quantization (PQ) code for each row of data; and
generating the index of the data table comprising at least the centroid ID and the PQ code for each of the plurality of rows of data in the data table.

6. The method of claim 1, further comprising:
partitioning the plurality of rows of data in inverted file index (IVF) partitions based on a plurality of centroid IDs, each IVF partition comprising a set of rows of data that are assigned to a same centroid.

7. The method of claim 1, wherein generating an index of the data table comprises:
generating a secondary index comprising metadata indexing, the metadata comprising information of the respective row of data.

8. A non-transitory computer readable storage medium comprising stored program code, the program code comprising instructions, the instructions when executed cause a processor system to:
receive a data table, the data table comprising a plurality of rows of data;
assign the plurality of rows of data to a plurality of computing nodes;
apply, at each assigned computing node, a machine learning model to the assigned rows of data for indexing each row in the data table, wherein training the machine learning model comprises:
accessing a plurality of samples to be processed over one or more iterations of training the machine learning model;
in each iteration,
shuffling the plurality of samples;

partitioning the plurality of samples into one or more sets, each set comprising a set of the samples;

assigning the one or more sets of samples to the plurality of computing nodes;

applying, at each of the plurality of computing nodes, the machine learning model to the assigned sets to cluster the plurality of samples; and receiving an output from the machine learning model, the output comprising one or more centroids, each centroid clustered with a cluster of samples;

performing the one or more iterations of training the machine learning model to stabilize the plurality of centroids; and determining a set of stabilized centroids, each centroid having a centroid ID;

receive, for each row of data in the data table, a centroid ID of one of the plurality of centroids that the respective row of data is assigned to; and generate an index of the data table with at least the received centroid ID of each of the plurality of rows of data in the data table.

9. The non-transitory computer readable storage medium of claim 8, wherein the instructions to access a plurality of samples to be processed over one or more iterations of training the machine learning model cause the processor system to:

generate a plurality of embedding vectors, each embedding vector representing one of the plurality of samples.

10. The non-transitory computer readable storage medium of claim 8, wherein the instructions to apply, at each of the plurality of computing nodes, the machine learning model to the assigned sets to cluster the plurality of samples cause the processor system to:

apply K-Means algorithm to each of the assigned set of samples; and assign each of the assigned set of samples to one of the one or more centroids, the one of the one or more centroids is a nearest centroid to the respective sample.

11. The non-transitory computer readable storage medium of claim 8, wherein the instructions to perform the one or more iterations of training the machine learning model to stabilize the plurality of centroids cause the processor system to:

determine that a change in the plurality of centroids between two successive iterations meets a predetermined condition.

12. The non-transitory computer readable storage medium of claim 8, wherein the instructions to generate an index of the data table cause the processor system to:

compute a product quantization (PQ) code for each row of data; and generate the index of the data table comprising at least the centroid ID and the PQ code for each of the plurality of rows of data in the data table.

13. The non-transitory computer readable storage medium of claim 8, wherein the instructions cause a processor system to:

partition the plurality of rows of data in inverted file index (IVF) partitions based on a plurality of centroid IDs, each IVF partition comprising a set of rows of data that are assigned to a same centroid.

14. The non-transitory computer readable storage medium of claim 8, wherein the instructions to generate an index of the data table cause the processor system to:

generate a secondary index comprising metadata indexing, the metadata comprising information of the respective row of data.

15. A system comprising:

one or more computer processors; and one or more computer-readable mediums storing instructions that, when executed by the one or more computer processors, cause the system to:

receive a data table, the data table comprising a plurality of rows of data;

assign the plurality of rows of data to a plurality of computing nodes;

apply, at each assigned computing node, a machine learning model to the assigned rows of data for indexing each row in the data table, wherein training the machine learning model comprises:

accessing a plurality of samples to be processed over one or more iterations of training the machine learning model;

in each iteration, shuffling the plurality of samples;

partitioning the plurality of samples into one or more sets, each set comprising a set of the samples;

assigning the one or more sets of samples to the plurality of computing nodes;

applying, at each of the plurality of computing nodes, the machine learning model to the assigned sets to cluster the plurality of samples; and receiving an output from the machine learning model, the output comprising one or more centroids, each centroid clustered with a cluster of samples;

performing the one or more iterations of training the machine learning model to stabilize the plurality of centroids; and determining a set of stabilized centroids, each centroid having a centroid ID;

receive, for each row of data in the data table, a centroid ID of one of the plurality of centroids that the respective row of data is assigned to; and generate an index of the data table with at least the received centroid ID of each of the plurality of rows of data in the data table.

16. The system of claim 15, wherein the instructions to access a plurality of samples to be processed over one or more iterations of training the machine learning model cause the system to:

generate a plurality of embedding vectors, each embedding vector representing one of the plurality of samples.

17. The system of claim 15, wherein the instructions to apply, at each of the plurality of computing nodes, the machine learning model to the assigned sets to cluster the plurality of samples cause the system to:

apply K-Means algorithm to each of the assigned set of samples; and assign each of the assigned set of samples to one of the one or more centroids, the one of the one or more centroids is a nearest centroid to the respective sample.

18. The system of claim 15, wherein the instructions to perform the one or more iterations of training the machine learning model to stabilize the plurality of centroids cause the system to:

determine that a change in the plurality of centroids between two successive iterations meets a predetermined condition.

19. The system of claim 15, wherein the instructions to generate an index of the data table cause the system to:

compute a product quantization (PQ) code for each row of data; and generate the index of the data table comprising at least the centroid ID and the PQ code for each of the plurality of rows of data in the data table.

20. The system of claim 15, wherein the instructions cause the system to:

partition the plurality of rows of data in inverted file index (IVF) partitions based on a plurality of centroid IDs, each IVF partition comprising a set of rows of data that are assigned to a same centroid.

\*　　\*　　\*　　\*　　\*